(12) United States Patent
Beckman et al.

(10) Patent No.: US 8,694,565 B2
(45) Date of Patent: Apr. 8, 2014

(54) LANGUAGE INTEGRATED QUERY OVER VECTOR SPACES

(75) Inventors: Brian Beckman, Newcastle, WA (US); Henricus Johannes Maria Meijer, Mercer Island, WA (US); Bernard Johnston, Lafayette, CO (US)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 13/161,933

(22) Filed: Jun. 16, 2011

(65) Prior Publication Data

US 2012/0323984 A1 Dec. 20, 2012

(51) Int. Cl.
*G06F 17/16* (2006.01)

(52) U.S. Cl.
USPC .......................................... 708/200

(58) Field of Classification Search
None
See application file for complete search history.

(56) References Cited

U.S. PATENT DOCUMENTS

| | | | | |
|---|---|---|---|---|
| 6,760,724 | B1 * | 7/2004 | Chakrabarti et al. ................. | 1/1 |
| 2009/0037193 | A1 | 2/2009 | Vempati et al. | |
| 2010/0131745 | A1 | 5/2010 | Meijer et al. | |
| 2012/0316844 | A1 * | 12/2012 | Shah et al. ......................... | 703/2 |
| 2012/0323984 | A1 * | 12/2012 | Beckman et al. ............. | 708/403 |
| 2013/0159969 | A1 * | 6/2013 | Meijer et al. .................. | 717/116 |

OTHER PUBLICATIONS

"Subject/Observer is Dual to Iterator", Retrieved at <<http://csl.stanford.edu/~christos/pldi2010.fit/meijer.duality.pdf>>Jan. 16, 2010, pp. 2.

SOMASEGAR, "Reactive Extensions for .NET (Rx)", Retrieved at <<http://blogs.msdn.com/b/somasegar/archive/2009/11/18/reactive-extensions-for-net-rx.aspx>>, Nov. 18, 2009, pp. 11.

"DEVHOL203—Curing the asynchronous blues with the Reactive Extensions for JavaScript", Retrieved at <<http://download.microsoft.com/download/1/6/1/161ABC6D-2CBB-4BFF-B9D8-D28B799FA8D8/Rx HOL JavaScript.pdf>>, Retrieved Date: Jul. 12, 2010, pp. 32.

"An RSS Dashboard in F#, part two (IObservables)", Retrieved at <<http://lorgonblog.spaces.live.com/blog/cns!701679AD17B6D310!1767.entry>>, Dec. 19, 2009, pp. 4.

"Notes from the Rx talk", Retrieved at <<http://nitoprograms.blogspot.com/2009/09/notes-from-rx-talk.html>>, Sep. 3, 2009, pp. 8.

Yao, et al., "LINQ and the .NET Compact Framework 3.5", Retrieved at <<http://www.informit.com/articles/article.aspx?p=1397803&seqNum=2>>, Oct. 6, 2009, pp. 40.

"Introduction to the Reactive Framework Part V", Retrieved at <<http://weblogs.asp.net/podwysocki/archive/2009/11/18/introduction-to-the-reactive-framework-part-v.aspx>>, Nov. 18, 2009, pp. 4.

"Numerical integration", Retrieved at <<http://en.wikipedia.org/wiki/Numerical_integration>>, Retrieved Date: Jul. 12, 2010, pp. 7.

"Some recent papers", Retrieved at <<http://users.info.unicaen.fr/~karczma/arpap/>>, Retrieved date: Jul. 13, 2010, pp. 3.

* cited by examiner

*Primary Examiner* — David H Malzahn

(57) ABSTRACT

Language-integrated query (LINQ) operators can be extended to a set of vectors associated with a digital signal processing (DSP) environment. A language-integrated query (LINQ) operator can be created to execute a change of basis for a set of vectors. LINQ operators can be further be utilized with specifically generated parameters to perform a change of basis for the set of vectors. Additionally, the standard LINQ operators can be extended to enable querying with LINQ against the set of vectors.

20 Claims, 9 Drawing Sheets

LANGUAGE INTEGRATED QUERY OVER VECTOR SPACES

BACKGROUND

Language-integrated query (LINQ), and supporting technology, provide a convenient and declarative shorthand query syntax (e.g., SQL-like) to facilitate specification of queries within a programming language (e.g., C#®, Visual Basic® . . . ). More specifically, query operators are provided that map to lower-level language constructs or primitives such as methods and lambda expressions. Query operators are provided for various families of operations (e.g., filtering, projection, joining, grouping, ordering . . . ), and can include but are not limited to "where" and "select" operators that map to methods that implement the operators that these names represent.

In particular, LINQ defines a set of method names (called standard query operators, or standard sequence operators), along with translation rules from query expressions to expressions using these method names, lambda expressions and anonymous types. These can, for example, be used to project and filter data in arrays, enumerable classes, XML (LINQ to XML), relational databases, and third party data sources. By way of example, a user can specify a query in a form such as "from n in numbers where n<10 select n," wherein "numbers" is a data source and the query returns integers from the data source that are less than ten. Further, query operators can be combined in various ways to generate queries of arbitrary complexity.

Conventionally, LINQ queries have be specified and executed with respect to a relational store. In a relational store or database, data is structured in terms of one or more tables. Tables are relations that comprise a number of columns and rows, wherein the named columns are referred to as attributes and rows capture data for specific entity instances. However, LINQ queries can be extended to support execution over non-relational data such as key-value stores, which maps unique keys to a set of one or more values. More specifically, the key-value store stores values and an index to facilitate location of the stored values based on a key.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to language-integrated query (LINQ) operators. LINQ operator(s) can be generated and executed with particular parameters in order to effect a change of basis for a set of vectors. The set of vectors can be related to a digital signal processing (DSP) environment in which the set of vectors can be any suitable vector corresponding to discrete time signals. Specifically, LINQ operators can be executed with parameters in order to change the set of vectors from one basis to another basis. In other words, LINQ operators can perform transforms for vector data rather than complex computations or algorithms. Additionally, querying with standard LINQ operators can be extended to the set of vectors.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Details below are generally directed toward applying a language-integrated query (LINQ) to perform a vector space change of basis. In other words, LINQ operators can implement a change of basis for a set of vectors represented in vector space. Such change of basis for a set of vectors can be a transform by employing LINQ and, in particular, LINQ query operators. LINQ operators can be extended to operate over the set of vectors represented in vector space wherein the vector space is generic over any field (e.g., a generalization of ordinary arithmetic objects with addition and multiplication that obey associative and distributive properties). Stated differently, LINQ operators implement a change of basis for a set of vectors for an underlying field such as complex numbers, real numbers, and quaternion numbers, among others.

Conventional techniques often require complex and resource-intensive calculations in order to perform change of basis for a set of vectors. Furthermore, advanced expertise is typically required in order to comprehend execution of such change of basis. This situation can be addressed by employing LINQ operators to perform a basis change for a set of vectors. Specifically, a "SelectMany" can be called and executed with specific parameters in order to enable a transform and change of basis for a set of vectors. The LINQ operator basis change technique can be employed having knowledge of LINQ yet little or no knowledge of the complexities involved with changing basis with a set of vectors.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
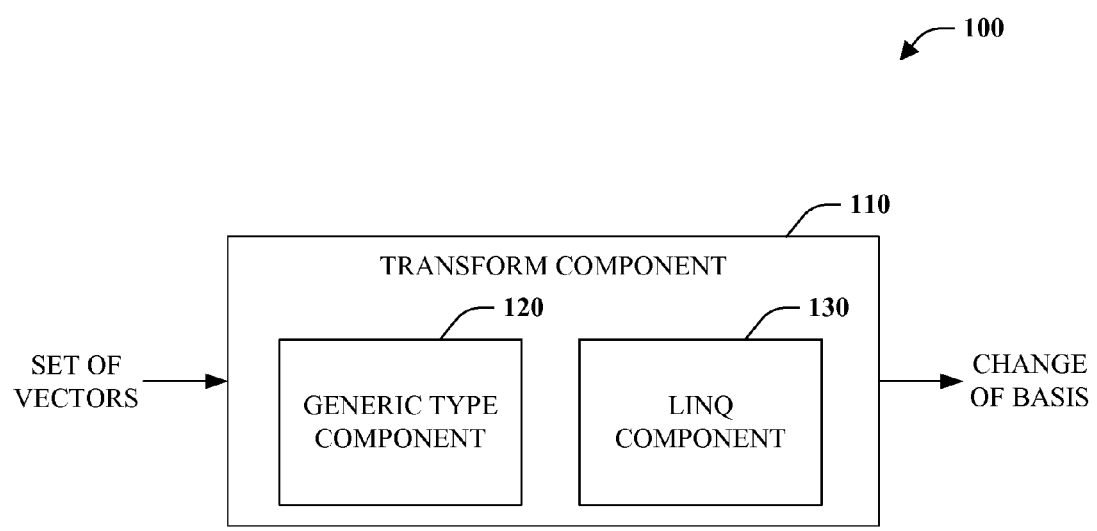
FIG. 1 is a block diagram of a vector conversion system.

Referring initially to FIG. 1, a vector conversion system 100 is illustrated. The vector conversion system 100 includes a transform component 110 that enables language-integrated query (LINQ) operators to be utilized to specify and ultimately effect a change of basis for a set of one or more vectors. In particular, the set of vectors can be represented in a vector space as arrays a length "N" (where "N" is a positive integer) of elements from an underlying mathematical field. Based at least in part upon this representation, the transform component 110 can extend LINQ operators to perform a change of basis for the set of vectors.

A vector space is a non-empty set of vectors over a field (e.g., real numbers, complex numbers . . . ) defined by two operations, namely vector addition and scalar multiplication as well as associated mathematical properties thereof. Graphically, a vector space can be viewed with respect to a number of vectors in a plane. For example, consider a piece of graph paper including an arrow from one point to another, which is a vector. This vector includes components, or in other words dimensions. For instance, a vector "A" can be drawn on the graph paper that goes four (4) blocks over to the right and three (3) blocks up. The vector "A" can be expressed (e.g., decomposed, expanded, etc.) in the standard basis in which the "X" component is four (4) and the "Y" component is three (3). Another vector "B" can be included on the graph paper that starts at the head of the arrow on vector "A" and goes two (2) over and five (5) up (e.g., X component 2 and Y component 5). A vector space allows for vector addition— connect the tail of vector "A" to the head of vector "B" to produce new vector "C." Vector "C" goes "4+2" over and "3+5" up (e.g., expression of vector C is X component 6 and Y component 8). In other words, vector "C" is the vector sum of vector "A" and vector "B." Those components are represented with respect to a particular grid on the graphing paper.

Now consider employment of another sheet of tracing graph paper (e.g., see-through graph paper) placed on top of the graph paper. In other words, vector "A," vector "B," and vector "C" can be seen through the tracing graph paper. This tracing paper can be rotated around the tail of vector "A." For instance, a tack can be placed on the tail of vector "A" through the tracing graph paper and the graph paper in which the tracing graph paper is rotated. The vectors have not changed but the projection of the vectors onto the tracing graph paper has changed—this is a change of basis (e.g., rotation about a point). Other change of basis can include sliding the tracing paper, a combination of a slide and a rotation, a sheering of the tracing graph paper (e.g., not physically possible), and so on. In general, change of basis for a set of vectors is a change of projection and orientation around a particular point.

These changes of basis can be executed with LINQ in which the change of basis can be related to any set of vectors from an underlying mathematical field. For instance, the change of basis can be a Discrete Fourier Transform, a Wavelet Transform, expansion in Legendre Functions, Hermite Functions, Hypergeometric Functions, Chebyshev polynomials, Gegenbaur polynomial, or any complete collection of orthonormal functions, among others. In general, LINQ operators can enable a change of basis for any set of vectors represented in vector space as arrays of length "N" of elements over any underlying mathematical field, where "N" is a positive integer.

The subject disclosure includes exemplary techniques associated with sequence operators (e.g., LINQ operator(s), among others) in order to implement a change of basis for a set of vectors represented in a vector space. However, it is to be appreciated that the subject disclosure is intended to include the extension of any suitable functional programming language as well as any suitable functional programming language operator(s) (e.g., sequence operator(s)) to effect a change of basis for a set of vectors. For example, a sequence operator can be a defined method name for a functional programming language. Furthermore, functional programming languages can include programming structures (e.g., monads) that represent computations (e.g., also referred to as a "computational monad"), wherein a computational monad can be expressed in various programming languages such as Java, Scala, Python, Haskell, among others. In general, a monad can include two operators (e.g., a bind and a return) and a type constructor that allows accurate composition of monadic functions. Thus, the subject disclosure further includes extending any suitable computational monad or sequence operator associated therewith in order to employ a change of basis for a set of vectors as described in more detail below. For example, Haskell sequence operator(s) can be extended and in particular, "FlatMap" can be extended to change basis for a set of vectors represented in vector space. It is to be appreciated and understood that such variations from one functional programming language and sequence operator(s) to another functional programming language and sequence operator(s) are within the scope of the subject innovation.

Continuing with FIG. 1, the transform component 110 includes a generic type component 120. The generic type component 120 creates a vector space for the set of vectors. Furthermore, the generic type component 120 maps the set of vectors and vector space to a generic type within a programming language. Stated differently, the generic type component 120 represents a basis of the vector space corresponding to the set of vectors as a generic type parameter in a programming language. By way of example and not limitation, the programming language can be any .NET® language such as C#®, F#, or a Visual Basic®. The basis represented by the generic type component 120 can be, but is not limited to, a standard basis, the Fourier Basis, the Wavelet Basis, a basis related to the standard orthogonal polynomials, a basis related to Legendre Polynomials, a basis related to Gegenbauer Polynomials, a basis related to Hermite Polynomials, a basis corresponding to the Hypergeometric functions, a Chebyshev basis, among others.

The generic type component 120 further monitors criteria associated with the set of vectors received, collected, gathered, etc. The generic type component 120 can check the set of vectors to ensure criteria is satisfied. For example, components of the set of vectors can be numbers drawn from a field, wherein the numbers can be added, subtracted, multiplied, and divided. It is to be appreciated the components of the vectors can be other kinds of numbers such as numbers that are drawn from a field (e.g., field of complex numbers, field of real numbers, field of quaternion numbers). Additionally, any number of dimensions can be employed. A vector in "N" dimensions has "N" components, each of which is number from the underlying field (where "N" is a positive integer).

The transform component 110 further includes a LINQ component 130 that employs LINQ operators to the set of vectors represented in the vector space. In particular, the LINQ component 130 executes a LINQ operator with specific and tailored parameters in order to perform a change of basis. For instance, the LINQ component 130 can implement LINQ operators such as, "Return" (e.g., constructor), "Select" and "SelectMany" as change of basis for the set of vectors. Stated differently, the LINQ component 130 generates parameters with the set of vectors and executes LINQ operators in order to perform a change of basis (also referred to as a transform).

It is to be appreciated that the subject innovation can be employed with LINQ operators as well as any suitable operators, functions, or mechanisms that perform operations comparable to particular LINQ operators. For instance, the "SelectMany" LINQ operator can project each element of a sequence to an IEnumerable<T> and flattens the resulting sequences into one sequence. In particular, "SelectMany" can take a sequence, iterate over each element in the sequence, projecting each element into IEnumerable<T> (e.g., while iterating), and aggregates the resulting IEnumerables back into a single sequence.

Figure 2:
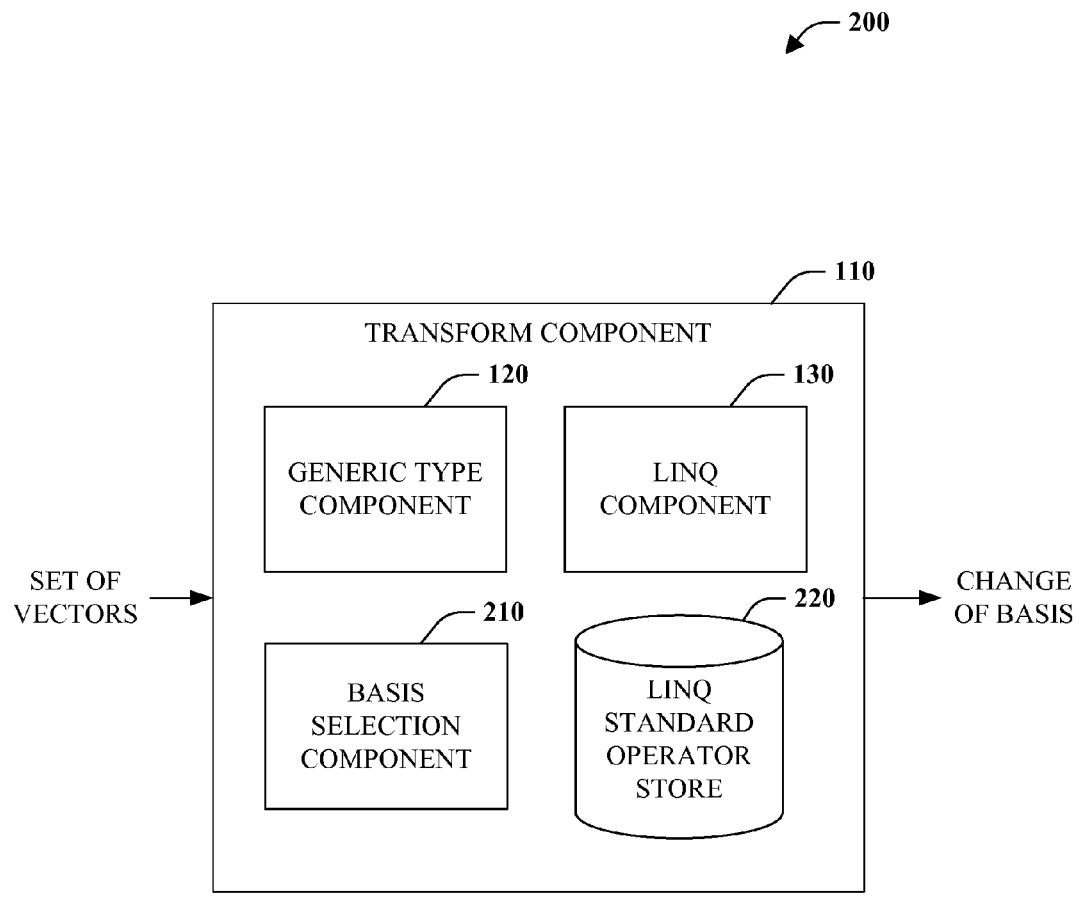
FIG. 2 is a block diagram of a change of basis system that employs a language-integrated query (LINQ) operator.

FIG. 2 illustrates exemplary change of basis system 200 that employs a language-integrated query (LINQ) operator. The change of basis system 200 includes the transform component 110 that creates a LINQ operator for execution to perform a change of basis for a set of vectors. In other words, the change of basis system 200 leverages LINQ operator(s) to perform a transform such as, but not limited to, a Fourier Transform, a Wavelet Transform, or expansion in Legendre polynomials, expansion in Chebyshev polynomials, among others. As discussed above, the transform component 110 can include the generic type component 120 and the LINQ component 130. Moreover, the transform component 110 allows a change of basis for a set of vectors for any underlying field, wherein the underlying field can be, but is not limited to, complex numbers, real numbers, or quaternion numbers, among others. Therefore, the transform component 110 enables the application of change of basis utilizing LINQ operators to Quantum computing, Computer Graphics, non-commutative algebra (e.g., Geometric Algebra, Clifford Algebra, etc.) with applications in various branches of physics and engineering.

The change of basis system 200 further includes a basis selection component 210. With the basis selection component 210, the set of vectors can be manipulated by the LINQ operators in order to perform a change of basis. In particular, the basis selection component 210 can include mappings, algorithms, and processing parameters in which a specific basis change utilizes for a transform.

Generally, the basis selection component 210 facilitates changing a source basis of a set of vectors to a target basis for the set of vectors. For instance, a change of basis for a set of vectors can include particular set or subset of LINQ operators and parameters to perform the transform to a target basis (discussed in more detail in FIG. 3). Moreover, the basis selection component 210 can include interfaces in which available basis changes are displayed for selection to employ. For example, the basis selection component 210 can enable a selection from a list of available basis (e.g., a standard basis, the Fourier Basis, the Wavelet Basis, a basis related to the standard orthogonal polynomials, a basis related to Legendre Polynomials, a basis related to Gegenbauer Polynomials, a basis related to Hermite Polynomials, a basis corresponding to the Hypergeometric functions, a basis corresponding to Chebyshev polynomials, etc.), wherein based upon such selection, particular LINQ operators and settings (e.g., parameters) are employed to update the set of vectors to a target basis (e.g., selected basis from the list).

The change of basis system 200 can be employed for any suitable LINQ standard operator store 220 (also referred to as store 220). In general, the LINQ component 130 can execute LINQ operators via the store 220 regardless of a data connection there between. Moreover, the basis selection component 210 can leverage the store 220 for any suitable LINQ operators for a target basis. For instance, the store 220 can be cloud-based, server-based, wireless, hard-wired, and the like. In other words, the LINQ component 130 can directly execute LINQ operators with particular parameters in order to perform a specific change of basis selected (via the basis selection component 210). LINQ operators and other LINQ similar syntax can be leveraged from the store 220 independent of a physical location (e.g., remote, local, any combination thereof, etc.) and/or data connection (e.g., cloud, wireless, local area network (LAN), any combination thereof, etc.).

Figure 3:
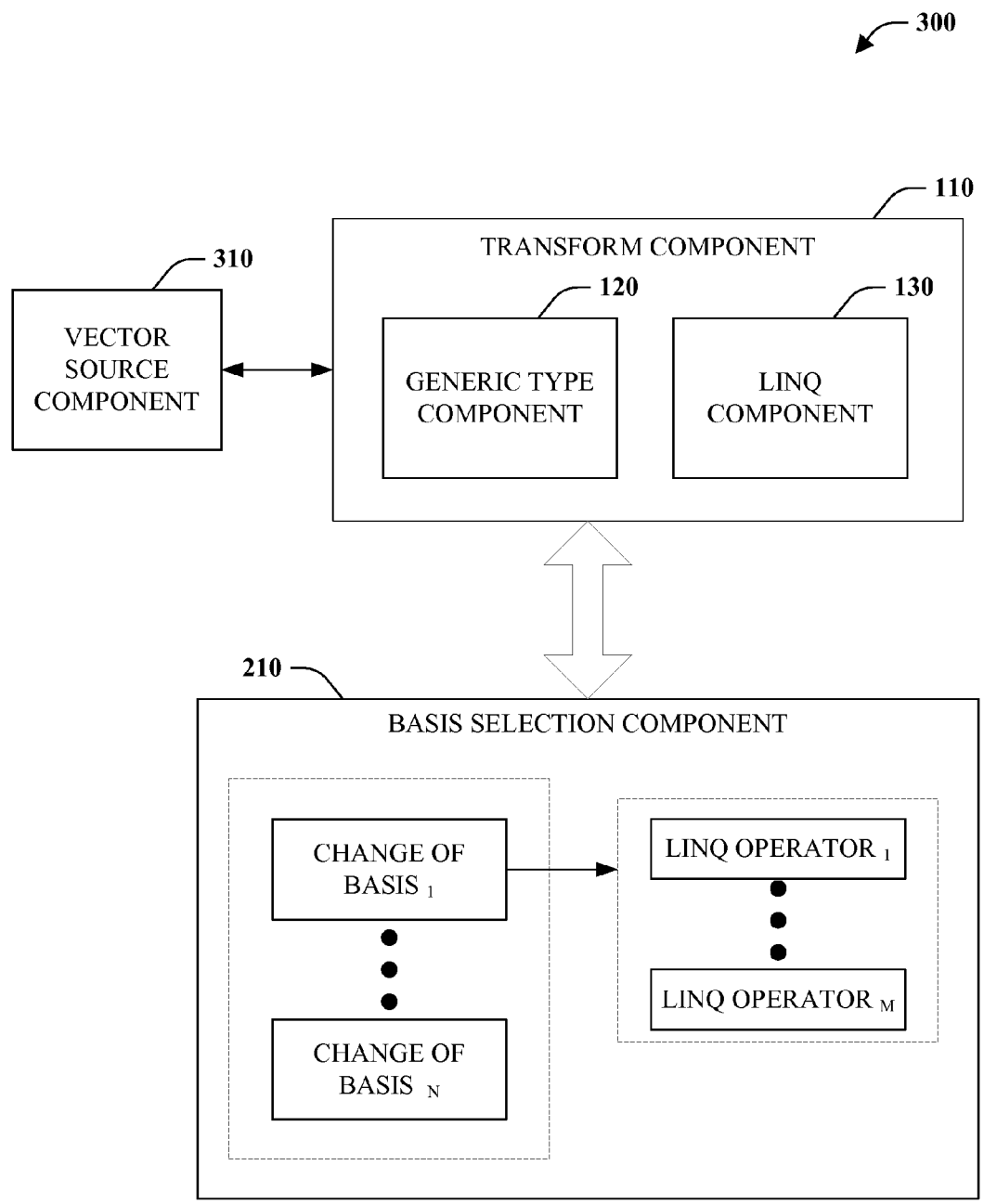
FIG. 3 is a block diagram of a vector transform system that performs a change of basis for a set of vectors.

FIG. 3 illustrates a vector transform system 300 that performs a change of basis for a set of vectors. The vector transform system 300 can include the transform component 110 that performs a change of basis for a set of vectors. Based on a collected set of vectors (e.g., vector data), the generic type component 120 can represent the set of vectors in a vector space and create a basis for the vector space as a generic type in a programming language (discussed above). The LINQ component 130 employs LINQ operators to perform a change of basis for the set of vectors.

A vector source component 310 can aggregate the set of vectors from any suitable source such as, but not limited to, a system, an environment, a store, a server, among others. In general, the vector source component 310 can collect vector data in which a change of basis is to be performed or can be performed. Although the vector source component 310 is illustrated as a separate component, it is to be appreciated that the vector source component 310 can be integrated into the transform component 110, integrated into the generic type component 120, integrated into the LINQ component 130, a cloud-based component, or any combination thereof. Moreover, the vector source component 310 can be any suitable Application Programming Interface (API) or plug-in that communicates with remote or local systems in order to aggregate vector data to which a change of basis is desired.

The vector transform system 300 further includes the basis selection component 210 that is configured to map LINQ operators to effect a particular change of basis for the set of vectors. The basis selection component 210 can facilitate performing various change of basis, wherein each change of basis can correlate to at least one LINQ operator with specific parameter(s). Stated differently, the basis selection component 210 manages LINQ operators and corresponding parameters such that a selected change of basis can be performed. It is to be appreciated and understood that the basis selection component 210 can manage any suitable number of change of basis such as a change of basis$_1$ to a change of basis$_N$, where "N" is a positive integer. Moreover, it is to be appreciated that for each change of basis$_1$ to change of basis$_N$, there can be any suitable number of LINQ operators utilized to perform the transform such as LINQ operator$_1$ to LINQ operator$_M$, where "M" is a positive integer. By way of example and not limitation, a change of basis of a set of vectors to the Fourier Basis can utilize three (3) LINQ operators whereas a change of basis for the set of vectors to the Wavelet Basis can utilize four (4) LINQ operators.

Figure 4:
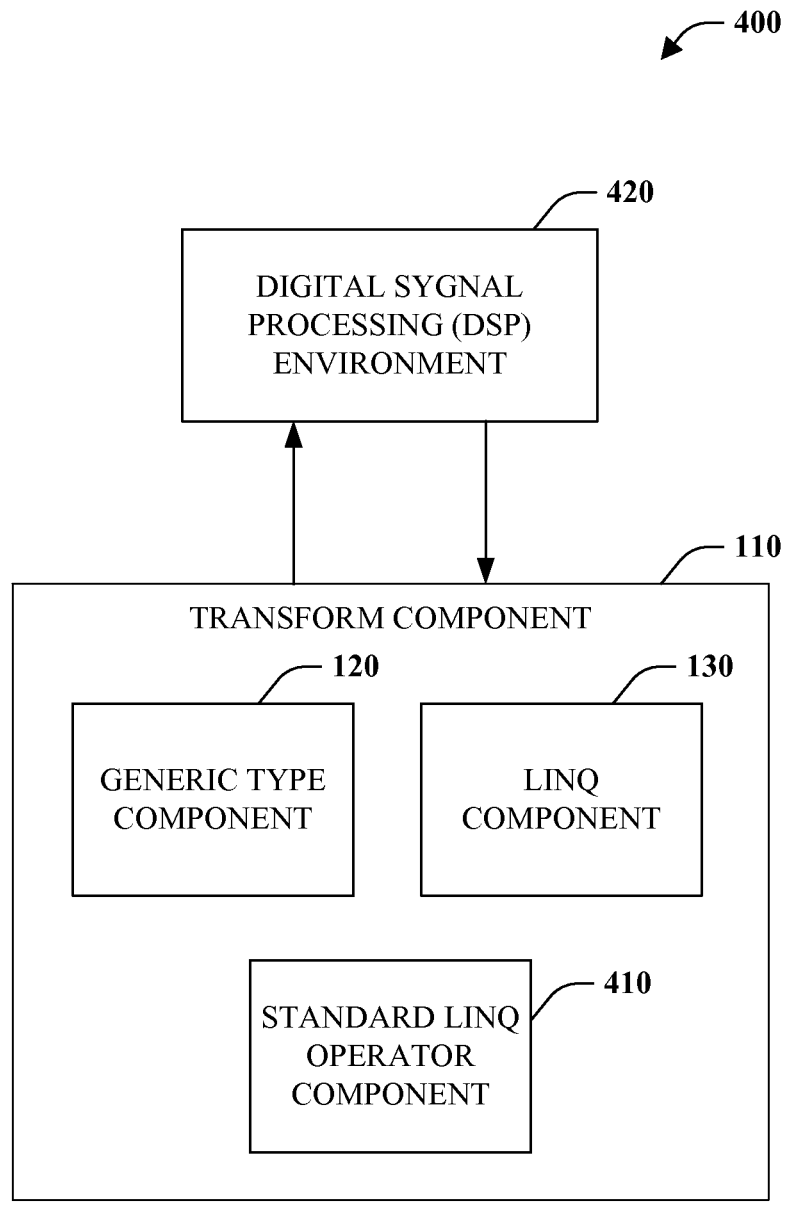
FIG. 4 is a block diagram of a system that executes a language-integrated query (LINQ) with a digital signal processing (DSP) environment.

FIG. 4 illustrates a 400 system that executes a language-integrated query (LINQ) with a digital signal processing (DSP) environment. The system 400 includes the transform component 110 that employs LINQ operators in order to generate transformed vector data. In addition, the transform component 110 can query vector data with LINQ operators and, in particular, standard LINQ query operators.

The transform component 110 includes a generic type component 120 that can create a vector space for a set of vectors. Moreover, the generic type component 120 can create a basis as a generic type in a programming language. For instance, the generic type component 120 can create the following basis as a generic type in a programming language: the Standard Basis, The Fourier Basis, the Wavelet basis, all the standard orthogonal polynomials like Legendre, Gegenbauer, Hermite, Hypergeometric functions, Chebyshev basis, etc. It is to be appreciated that Legendre polynomials can be employed for mapping applications based upon being the foundation for spherical harmonics, which improve accuracy and performance for some models of the "Lumpy Earth" (e.g., models related to the Earth's gravity field as being lumpy—also referred to as a geoid).

The LINQ component 130 generates LINQ operators that execute a change of basis for a set of vectors. In general, the LINQ component 130 can implement a "Return" (constructor), "Select" and "SelectMany" as a change of basis in vector spaces and demonstrate a transform such as, but not limited to a Fourier Transform. The LINQ component 130 sets up a transform as a Kleisli composition, wherein a "SelectMany" is called over two arguments (e.g., parameters generated by the system 400). For instance, the LINQ component 130 can create an instance of the vector space in a first basis (e.g., Basis "B") and a function from the first basis (Basis "B") to a vector space in second basis (e.g., Basis "C"). The LINQ component 130 can execute "SelectMany" with the instance and the function to produce the vector space in the second basis (e.g., Basis "C"). Moreover, the above can be employed as a lazy mechanization of the change of basis as expansion of the set of vectors in the new basis (e.g., second basis, Basis "C", etc.).

The system 400 further includes a standard LINQ operator component 410 that extends LINQ operators to the set of vectors. The standard LINQ operator component 410 executes LINQ operators via querying with LINQ in order to perform sophisticated computations (e.g., in Digital Signal Processing (DSP), with sets of vectors, etc.) as well as all the applications of querying with LINQ over lists, arrays, Structured Query Language (SQL) tables, Extensible Markup Language (XML) documents, etc. In particular, operators of a LINQ API (e.g., Standard Query Operators, "Return," "SelectMany," etc.) can be executed with the set of vectors represented in the vector space. It is to be appreciated that the operators of a LINQ API are enabled based upon the theory of monads in programming Vector space is a monad over a choice of basis rather than a monad over changing numbers to complex, quaternions, etc. Stated differently, "SelectMany" is a unique LINQ operator in that if implemented (as discussed and shown herein) then the Standard LINQ operators can be performed.

The set of vectors represented in vector space can originate from a Digital Signal Processing (DSP) environment 420. In other words, the system 400 can extend LINQ operators with created parameters in order to perform change of basis as well as implementation of querying with LINQ in connection with the Digital Signal Processing (DSP) environment 420. The DSP environment 420 can be any suitable environment that includes vector data related to discrete time signals. Moreover, it is to be appreciated that the DSP environment 420 can be remote, local, cloud-based, and/or any combination thereof. Although not depicted in FIG. 4, the vector source component 310 can aggregate vector data from the DSP environment 420.

Figure 5:
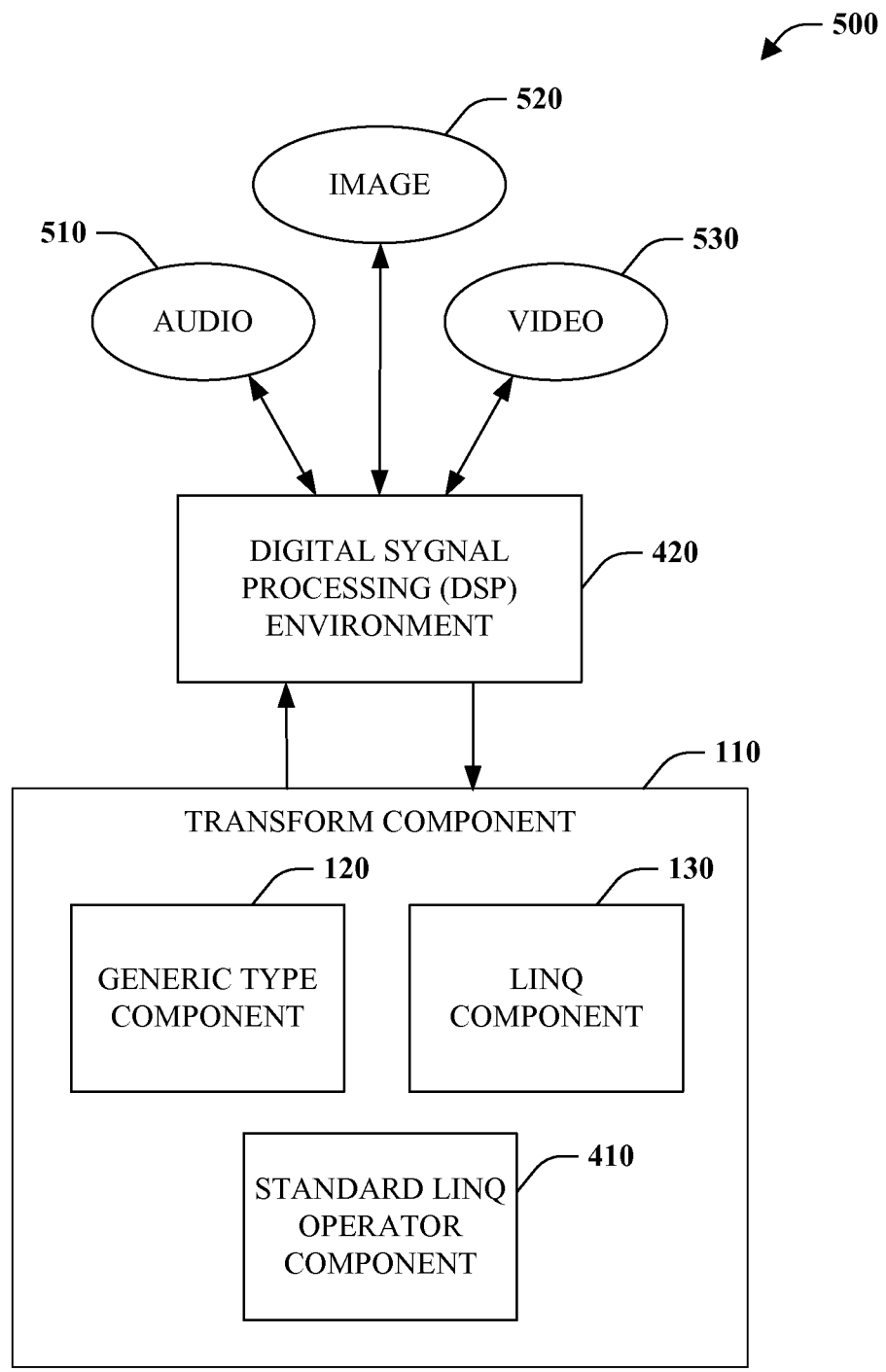
FIG. 5 is a block diagram of a system that facilitates gathering sets of vectors from a digital signal processing (DSP) environment.

FIG. 5 illustrates a system 500 that facilitates gathering sets of vectors from a digital signal processing (DSP) environment. The system 500 includes the transform component 110 that utilizes at least one LINQ operator to perform a change of basis for a set of vectors associated with the Digital Signal Processing (DSP) environment 420.

As discussed, the DSP environment 420 can include vector data related to any discrete time signals. In particular, the DSP environment 420 can correspond to audio 510, image 520, and video 530. The transform component 110 extends LINQ operators to audio 510, image 520, and video 530. Moreover, the transform component 110 allows LINQ operators (e.g., querying with LINQ, employing LINQ to change basis, etc.) to be implemented with DSP applications such as, but not limited to, filtering, harmonic analysis, image processing, audio equalization, video compression, among others.

For example, the DSP environment 420 can include vector data in which the generic type component 120 and the LINQ component 130 can perform a change of basis for such vector data. It is to be appreciated that the change of basis performed can facilitate implementing DSP applications stated above. Moreover, the standard LINQ operator component 410 extends LINQ operators to query the vector data. Stated differently, vector data associated with the DSP environment 420 can be queried with LINQ using LINQ operators rather than typical complex algorithms or computations associated with change of basis, transforms, and the like.

The generic type component 120 represents the set of vectors in a Vector Space ("VS") as arrays of length "N" of elements from an underlying mathematical field, where "N" is a positive integer. It is to be appreciated that the field can be any suitable mathematical field such as, but not limited to, complex numbers, real numbers, or quaternion numbers, among others. The generic type component 120 further represents a basis of the Vector Space ("VS") as an abstract base class supporting: an integer dimension property "n", where "n" is a positive integer; an n-array of vectors (expressed in a standard basis) constituting this basis; an inner product over pairs of vectors (e.g., when vectors are expressed in the same basis, the inner product can be computed); and an expand method that expresses any vector in this basis (given that the prior basis of the vector is known).

By way of example and not limitation, the standard basis and the Fourier Basis can be implemented as subclasses of the abstract basis class. It is to be appreciated that other basis (e.g., a standard basis, the Fourier Basis, the Wavelet Basis, a basis related to the standard orthogonal polynomials, a basis related to Legendre Polynomials, a basis related to Gegenbauer Polynomials, a basis related to Hermite Polynomials, a basis corresponding to the Hypergeometric functions, a basis corresponding to Chebyshev polynomials, etc.) can be implemented in a substantially similar manner as the example of the standard basis and the Fourier Basis.

The LINQ component 130 represents the Vector Space ("VS") as a class generic on its basis parameter. Thus, one instance of this Vector Space class represents vectors expanded in the standard basis. Another instance of the class represents the same mathematical vector space just with vectors expanded in the Fourier Basis. It is to be appreciated that this can be extended to other basis as discussed above.

As discussed, the LINQ component 130 sets up a transform as a Kleisli composition, wherein a "SelectMany" is called over two arguments (e.g., parameters generated by the system 400). For instance, the LINQ component 130 can create an instance of the vector space in a first basis (e.g., Basis "B") and a function from the first basis (Basis "B") to a vector space in second basis (e.g., Basis "C"). The LINQ component 130 can execute "SelectMany" with the instance and the function to produce the vector space in the second basis (e.g., Basis "C"). Moreover, the above can be employed as a lazy mechanization of the change of basis as expansion of the set of vectors in the new basis (e.g., second basis, Basis "C", etc.). The LINQ component 130 can execute the LINQ operator "SelectMany" in order to effect the basis change as follows:

```
public static VS<C> SelectMany<B, C>(this VS<B> mb, Func<B,
    VS<C>> f)
        where B : Basis
        where C : Basis { return f(mb.MyBasis); }
```

"SelectMany" can be generalized to satisfy a programming language code-generation. However, it is to be appreciated that the following code is not needed for the correct monadic definition of Vector Space ("VS"). In particular, the "SelectMany" is generalized to satisfy C#® code-generation as follows:

```
public static VS<C> SelectMany<B, C>(this VS<B> mb, Func<B,
    VS<B>> f,
    Func<B, B, C> g)
        where B : Basis
        where C : Basis
        {
            return mb.SelectMany(x => f(x).Select(y => g(x, y)));
        }
```

Continuing with the above, the generalized "SelectMany" calls the ordinary "SelectMany (e.g., "mb.SelectMany") and the ordinary "Select" (e.g., "f(x).Select").

Additionally, a "Select" (e.g., map) builds up the generalized "SelectMany" as follows:

```
public static VS<C> Select<B, C> (this VS<B> mb, Func<B, C> b2c)
    where B : Basis
    where C : Basis { return Return(b2c(mb.MyBasis)); }
```

As discussed above, the standard LINQ operator component 410 extends LINQ standard query operators based on the above technique. Moreover, Fourier transform (following this example) is effected lazily by an expand operator after a basis change. It is to be appreciated that any suitable transform can be effected lazily by an expand operator after a basis change.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the transform component 110 or one or more sub-components thereof can employ such mechanisms to efficiently determine or otherwise infer conversion techniques related to generating a LINQ operator and associated parameters in order to perform a change of basis for a set of vectors represented within a vector space.

Figure 6:
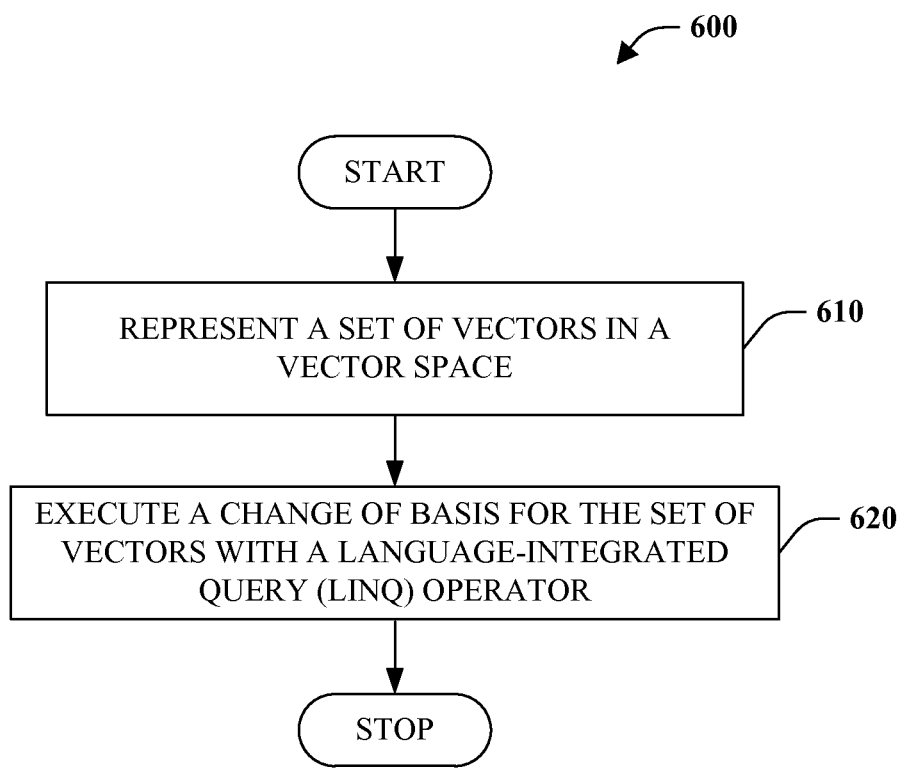
FIG. 6 is a flow chart diagram of a method of employing a language-integrated query (LINQ) operator to change basis for a set of vectors.
Figure 7:
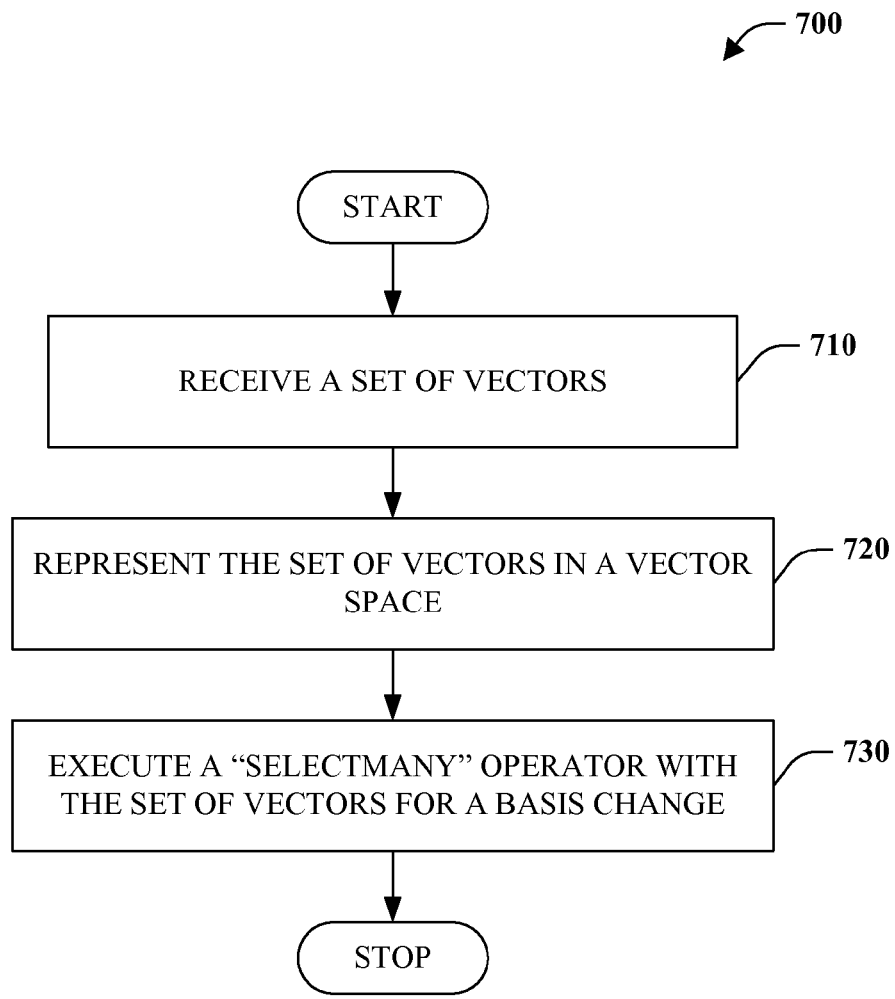
FIG. 7 is a flow chart diagram of a method of transforming a set of vectors to a basis with a language-integrated query (LINQ) operator.
Figure 8:
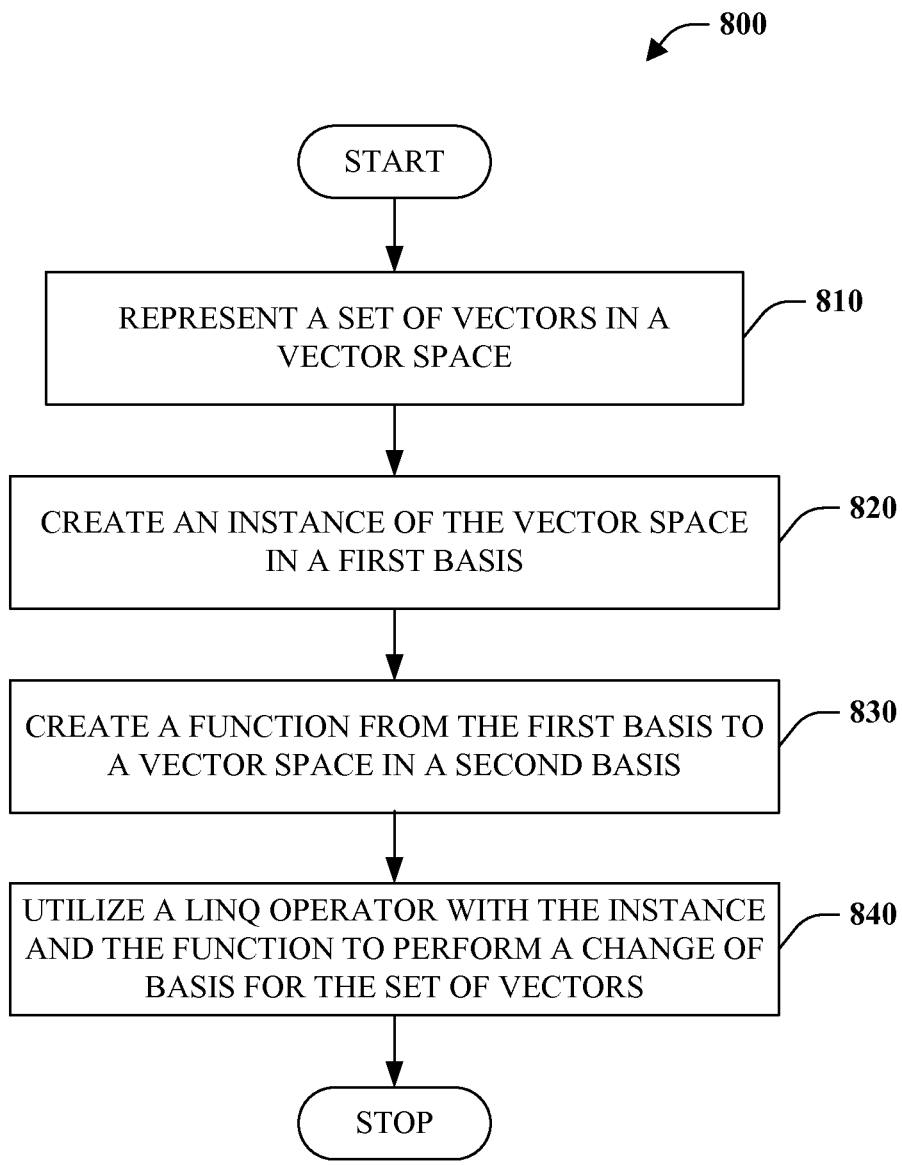
FIG. 8 is a flow chart diagram of a method of calling a language-integrated query (LINQ) operator.

In view of the exemplary systems described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 6 is a flow chart diagram of a method 600 of employing a language-integrated query (LINQ) operator to change basis for a set of vectors. At reference numeral 610, a set of vectors can be represented in a vector space. In general, any set of vectors can be represented in a vector space as arrays of length "N" (where "N" is a positive integer) of elements from an underlying mathematical field such as, but not limited to, the field of complex numbers, the field of real numbers, or the field of quaternions. The representation of a basis of the vector space can be as a generic type parameter in a computer programming language such as C#®, F#, .NET, or a Visual Basic®. At reference numeral 620, a change of basis for the set of vectors can be executed with a language-integrated query (LINQ) operator. In other words, LINQ operators employ a change of basis on a set of vectors that are represented in a vector space based at least in part upon particular parameters generated for the LINQ operator(s).

FIG. 7, a method 700 of transforming a set of vectors to a basis with a language-integrated query (LINQ) operator is illustrated. At reference numeral 710, a set of vectors are received. For instance, the set of vectors can be collected, received, gathered, transmitted, or communicated from a digital signal processing (DSP) environment. In another example, the set of vectors can be stored in a data store, wherein a DSP environment stored such set of vectors. The set of vectors can be processed or pre-processed prior to receipt in order to satisfy particular criteria. At reference numeral 720, the set of vectors are represented in a vector space. Stated differently, the set of vectors can be represented in a vector space as arrays of length "N" of elements from an underlying mathematical field, where "N" is a positive integer. At reference numeral 730, a "SelectMany" operator can be executed with the set of vectors for a basis change.

FIG. 8 is a flow chart diagram of a calling a language-integrated query (LINQ) operator for executing a change of basis for a set of vectors. At reference numeral 810, a set of vectors are represented in a vector space. For instance, the set of vectors can be represented in a vector space as arrays a length "N" (where "N" is a positive integer) of elements from an underlying mathematical field.

At reference numeral 820, an instance of the vector space can be created in a first basis. At reference numeral 830, a function from the first basis to a vector space in a second basis can be created. At reference numeral 840, a LINQ operator can be utilized with the instance and the function to perform a change of basis for the set of vectors. Stated differently, LINQ operators are employed to perform a transform and basis change for a given set of vectors represented in a vector space.

As used herein, the terms "component" and "system," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 9:
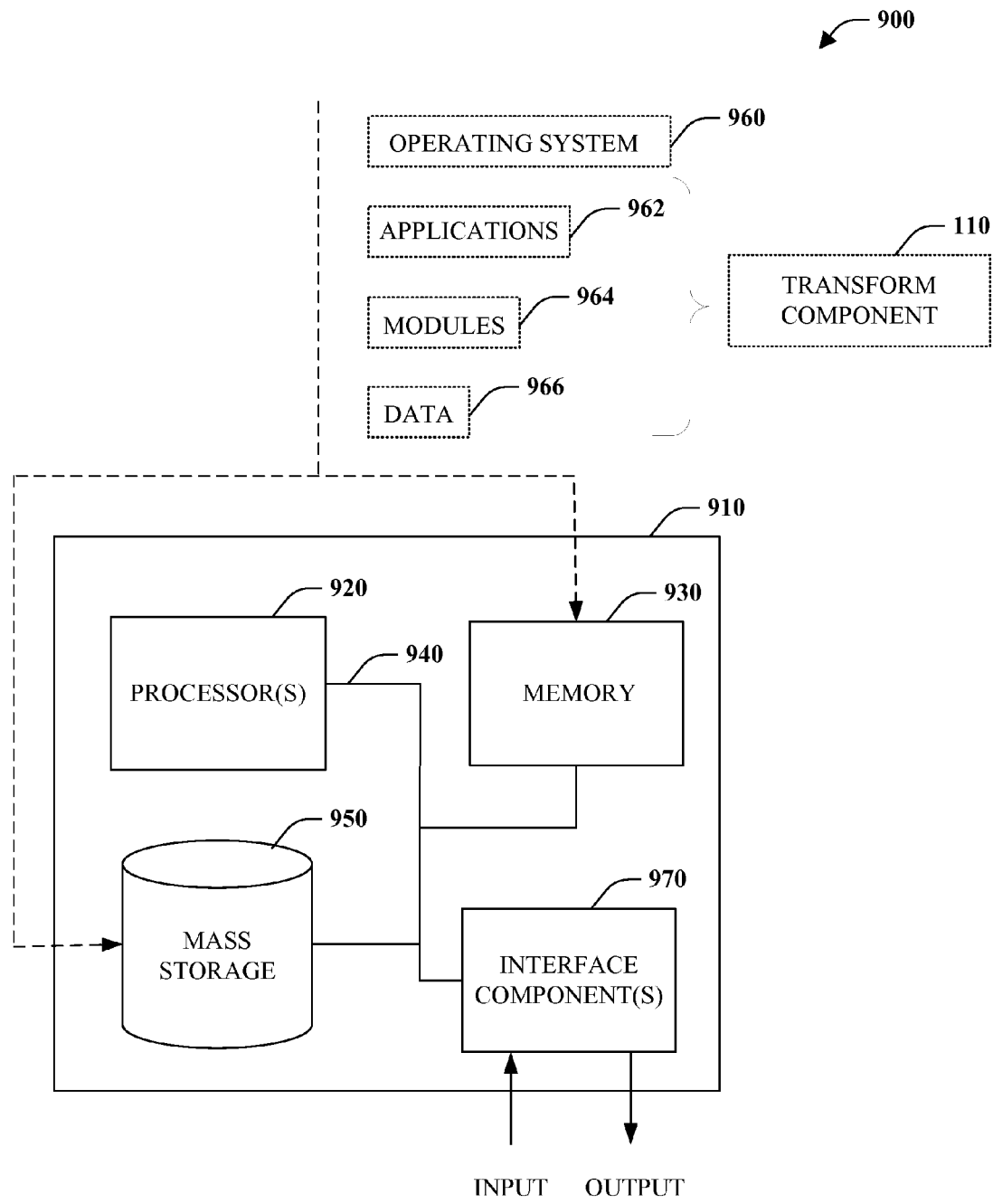
FIG. 9 is a schematic block diagram illustrating a suitable operating environment for aspects of the subject disclosure.

In order to provide a context for the claimed subject matter, FIG. 9 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 9, illustrated is an example general-purpose computer 910 or computing device (e.g., desktop, laptop, server, hand-held, programmable consumer or industrial electronics, set-top box, game system . . . ). The computer 910 includes one or more processor(s) 920, memory 930, system bus 940, mass storage 950, and one or more interface components 970. The system bus 940 communicatively couples at least the above system components. However, it is to be appreciated that in its simplest form the computer 910 can include one or more processors 920 coupled to memory 930 that execute various computer executable actions, instructions, and or components.

The processor(s) 920 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 920 may also be implemented as a combination of computing devices, for example a combination of a DSP and a microprocessor, a plurality of microprocessors, multi-core processors, one or more microprocessors in conjunction with a DSP core, or any other such configuration.

The computer 910 can include or otherwise interact with a variety of computer-readable media to facilitate control of the computer 910 to implement one or more aspects of the claimed subject matter. The computer-readable media can be any available media that can be accessed by the computer 910 and includes volatile and nonvolatile media and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 910.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 930 and mass storage 950 are examples of computer-readable storage media. Depending on the exact configuration and type of computing device, memory 930 may be volatile (e.g., RAM), non-volatile (e.g., ROM, flash memory . . . ) or some combination of the two. By way of example, the basic input/output system (BIOS), including basic routines to transfer information between elements within the computer 910, such as during start-up, can be stored in nonvolatile memory, while volatile memory can act as external cache memory to facilitate processing by the processor(s) 920, among other things.

Mass storage 950 includes removable/non-removable, volatile/non-volatile computer storage media for storage of large amounts of data relative to the memory 930. For example, mass storage 950 includes, but is not limited to, one or more devices such as a magnetic or optical disk drive, floppy disk drive, flash memory, solid-state drive, or memory stick.

Memory 930 and mass storage 950 can include, or have stored therein, operating system 960, one or more applications 962, one or more program modules 964, and data 966. The operating system 960 acts to control and allocate resources of the computer 910. Applications 962 include one or both of system and application software and can exploit management of resources by the operating system 960 through program modules 964 and data 966 stored in memory 930 and/or mass storage 950 to perform one or more actions. Accordingly, applications 962 can turn a general-purpose computer 910 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the transform component 110 can be, or form part, of an application 962, and include one or more modules 964 and data 966 stored in memory and/or mass storage 950 whose functionality can be realized when executed by one or more processor(s) 920, as shown.

In accordance with one particular embodiment, the processor(s) 920 can correspond to a system-on-a-chip (SOC) or like architecture including, or in other words integrating, both hardware and software on a single integrated circuit substrate. Here, the processor(s) 920 can include one or more processors as well as memory at least similar to processor(s) 920 and memory 930, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the transform component 110, and/or associated functionality can be embedded within hardware in a SOC architecture.

The computer 910 also includes one or more interface components 970 that are communicatively coupled to the system bus 940 and facilitate interaction with the computer 910. By way of example, the interface component 970 can be a port (e.g., serial, parallel, PCMCIA, USB, FireWire . . . ) or an interface card (e.g., sound, video . . . ) or the like. In one example implementation, the interface component 970 can be embodied as a user input/output interface to enable a user to enter commands and information into the computer 910 through one or more input devices (e.g., pointing device such as a mouse, trackball, stylus, touch pad, keyboard, microphone, joystick, game pad, satellite dish, scanner, camera, other computer . . . ). In another example implementation, the interface component 970 can be embodied as an output peripheral interface to supply output to displays (e.g., CRT, LCD, plasma . . . ), speakers, printers, and/or other computers, among other things. Still further yet, the interface component 970 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of facilitating computation with a set of vectors, comprising:
    employing at least one processor configured to execute computer-executable instructions stored in memory to perform the following acts:
    executing a computational monad to perform a change of basis for a set of vectors in a vector space.

2. The method of claim 1 further comprises creating an instance of the vector space in a first basis.

3. The method of claim 2 further comprises creating a function from the first basis to a vector space in a second basis.

4. The method of claim 3, executing a sequence operator to produce the vector space in the second basis.

5. The method of claim 4, utilizing the sequence operator with the first basis, the second basis, a first instance parameter, and a second instance parameter.

6. The method of claim 5, the first instance parameter is the instance of the vector space in the first basis and the second instance parameter is the function from the first basis to the vector space in the second basis.

7. The method of claim 1, performing the change of basis for the set of vectors underlying in a mathematical field complex numbers or quaternions.

8. The method of claim 1, executing a sequence operator to query the set of vectors, the sequence operator is integrated within a programming language.

9. A system that facilitates changing basis with a set of vectors, comprising:
    a processor coupled to a memory, the processor configured to execute the following computer-executable components stored in the memory:

a first component configured to utilize a language-integrated query (LINQ) operator to effect a change of basis for a set of vectors represented in a vector space.

10. The system of claim 9, the set of vectors are built from an underlying mathematical field of complex numbers or quaternions.

11. The system of claim 9, the set of vectors represent data with respect to a digital signal processing environment.

12. The system of claim 9 further comprises a second component configured to represent a basis of the vector space as a generic type parameter in a computer programming language.

13. The system of claim 12, the basis is at least one of a Fourier Basis, a Wavelet Basis, or a Legendre Basis.

14. The system of claim 12 further comprises a third component configured to create an instance of the vector space in a first basis.

15. The system of claim 14, the third component configured to create a function from the first basis to a vector space in a second basis.

16. The system of claim 15, the third component configured to call a "SelectMany" language-integrated query (LINQ) operator with the instance and the function to perform a change of basis for the set of vectors.

17. The system of claim 9 further comprises a fourth component that collects data from a digital signal processing environment to generate the set of vectors, the set of vectors relate to at least one of an audio signal, a video signal, or a compression of a signal.

18. The system of claim 9 further comprises a fifth component that extends a LINQ query operator to facilitate querying the set of vectors.

19. A method of vector computation, comprising:
    employing at least one processor configured to execute computer-executable instructions stored in memory to perform the following acts:
    generating a representation of a set of vectors in a vector space; and
    executing a language-integrated query (LINQ) operator with a first parameter and a second parameter to perform a change of basis for the set of vectors, the first parameter is an instance of the vector space in a first basis and the second parameter is a function from the first basis to a vector space in a second basis.

20. The method of claim 19, the change of basis is to at least one of a Fourier Basis, a Wavelet Basis, or a Legendre Basis.

* * * * *